(12) United States Patent
Sakai et al.

(10) Patent No.: US 8,637,827 B2
(45) Date of Patent: Jan. 28, 2014

(54) RADIATION MONITOR AND METHOD FOR CHECKING OPERATION OF THE SAME

(75) Inventors: Hirotaka Sakai, Tokyo (JP); Soichiro Morimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 777 days.

(21) Appl. No.: 12/651,173

(22) Filed: Dec. 31, 2009

(65) Prior Publication Data
US 2010/0102243 A1 Apr. 29, 2010

Related U.S. Application Data

(63) Continuation-in-part of application No. PCT/JP2008/002277, filed on Aug. 22, 2008.

(30) Foreign Application Priority Data

Aug. 24, 2007 (JP) ................................. 2007-217885

(51) Int. Cl.
*G01T 1/17* (2006.01)
(52) U.S. Cl.
USPC ........................................................ 250/369
(58) Field of Classification Search
USPC ........................................................ 250/369
See application file for complete search history.

(56) References Cited

U.S. PATENT DOCUMENTS

| 2004/0065836 A1* | 4/2004 | Schick et al. ............ 250/370.01 |
| 2004/0114725 A1 | 6/2004 | Yamamoto |
| 2005/0161610 A1* | 7/2005 | Spahn ....................... 250/370.09 |
| 2006/0097177 A1 | 5/2006 | Yamamoto |

FOREIGN PATENT DOCUMENTS

| JP | 02-102483 A | 4/1990 |
| JP | 02-128184 A | 5/1990 |
| JP | 2004-173907 A | 6/2004 |
| JP | 2004-239783 A | 8/2004 |

* cited by examiner

*Primary Examiner* — David Porta
*Assistant Examiner* — Shun Lee
(74) *Attorney, Agent, or Firm* — Foley & Lardner LLP

(57) ABSTRACT

A sensor section is provided with a detection element sensitive to light and radiation so that normal operation of the sensor section can be confirmed. The function for confirming operation of the sensor section using an optical pulse signal from a light emitting element is controlled from a monitor module section for connection with the sensor section. When the optical pulse for confirming operation of the detection element is generated, output from the sensor section is excluded from operation at the monitor module section so that confirmation of operation by an optical pulse is not affected. Furthermore, a configuration for stopping the sensor operation confirmation function when the output from the sensor section is high counting rate is provided over both the sensor section and the monitor module section.

11 Claims, 2 Drawing Sheets

RADIATION MONITOR AND METHOD FOR CHECKING OPERATION OF THE SAME

CROSS REFERENCES TO RELATED APPLICATIONS

This application is a continuation-in-part (CIP) application based upon the International Application PCT/JP2008/002277, the International Application Date of which is Aug. 22, 2008, and is based upon and claims the benefit of priority from the prior Japanese Patent Application No. 2007-217885, filed in the Japanese Patent Office on Aug. 24, 2007, the entire contents of which are incorporated herein by reference.

BACKGROUND OF THE INVENTION

The present invention relates to a radiation monitor that is provided in radiation utilization facilities, facilities requiring radiation protection, or the like so as to monitor radiation and a method for checking operation of the same and, more particularly, to a radiation monitor provided with an operation check function using an optical pulse and a method for checking operation of the same.

As a commonly-used radiation monitor, there is known a semiconductor type radiation monitor using a detection element obtained by giving sensitivity with respect to radiation to the p-n junction of a diode in a sensor section. The semiconductor type radiation monitor includes a radiation source in the sensor section in order to check whether the sensor section is normally operating. However, it is assumed from now on that regulation on handling of radioactive materials is made stricter, so that a radiation monitor that can check soundness of the operation of the sensor section without using a radiation source is required. The same can be said for other detection elements, such as those using a scintillator or photomultiplier.

In response to the above demand, a configuration in which an LED (Light Emitting Diode) is used in place of the radiation source is adopted. This configuration is achieved by using characteristics that the detection element has sensitivity with respect also to light. Meanwhile, in a detection element using a semiconductor, inappropriate reverse bias voltage may cause sensitivity, resulting in a false detection. In order to cope with this problem, there is proposed the following method. In this method, an LED is caused to emit optical pulses so as to obtain an output similar to the radiation, and the optical pulses are allowed to irradiate the detection element with the repetition frequency of the optical pulses controlled so as to perform operation check. Through this operation check, presence/absence of abnormality in reverse bias voltage is determined to thereby check the soundness of the operation of the sensor section (refer to, e.g., Japanese Patent Application Laid-Open Publication No. 02-128184, the entire content of which is incorporated herein by reference).

As described above, the above prior art is configured to detect the abnormality in the bias voltage by using an LED. Further, at present, strongly desired is a configuration capable of performing check of the soundness of the sensor section at any time, without influencing radiation measurement, from a monitor module section remotely installed from the sensor section.

BRIEF SUMMARY OF THE INVENTION

The present invention has been made in view of the above situation, and an object thereof is to provide a radiation monitor and its operation check method capable of performing check of the soundness of the sensor section at any time, without influencing radiation measurement, from a monitor module section remotely installed from the sensor section.

According to the present invention, there is provided a radiation monitor comprising a sensor section and a monitor module section which are disposed separately from each other and connected to each other via a signal transmission path, wherein the sensor section comprises: a detection element that detects radiation and has sensitivity with respect also to light, a signal processing section that converts an output from the detection element into an electric signal for output, a light emitting element that irradiates the detection element with light, and a light emission control circuit that controls the light emission of the light emitting element; the monitor module section comprises: a counter circuit section that counts the number of electric signals transmitted thereto from the signal processing section; a radiation amount calculation/display section that calculates radiation amount from the output of the counter circuit section and displays the calculation result; an abnormality determination/display section that determines whether the output of the counter circuit section is an abnormal value and displays the determination result; a switching section that switches the output destination of the counter circuit section between the radiation amount calculation/display section and the abnormality determination/display section; a timer section that outputs a timing signal at a constant timing; and a sensor operation check mode determination section that determines whether a sensor operation check mode is active based on the timing signal of the timer section and the amount of radiation output from the radiation amount calculation/display section and transmits a determination result signal indicating whether the sensor operation check mode is active to the switching section, the radiation amount calculation/display section, the abnormality determination/display section, and the light emission control circuit; and the signal transmission path transmits an output signal from the signal processing section to the counter circuit section and transmits a signal from the sensor operation check mode determination section to the light emission control circuit.

According to the present invention, there is provided a method for checking operation of a radiation monitor that monitors radiation by transmitting an output from a sensor section having a detection element that can detect light and radiation to a monitor module section via a signal transmission path, wherein a period during which a sensor operation check mode is not active and a period at which the sensor operation check mode is active are alternately repeated every predetermined time, while the sensor operation check mode is active, optical pulses are generated at a predetermined frequency during the sensor operation check mode, the optical pulses are detected by means of the detection element of the sensor section, the detection output is transmitted to the monitor module section for counting, and presence/absence of abnormality in sensor operation of the sensor section is determined based on whether the counted value falls within a predetermined range.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Embodiments of the present invention will be described below with reference to the accompanying drawings.

First Embodiment

Figure 1:
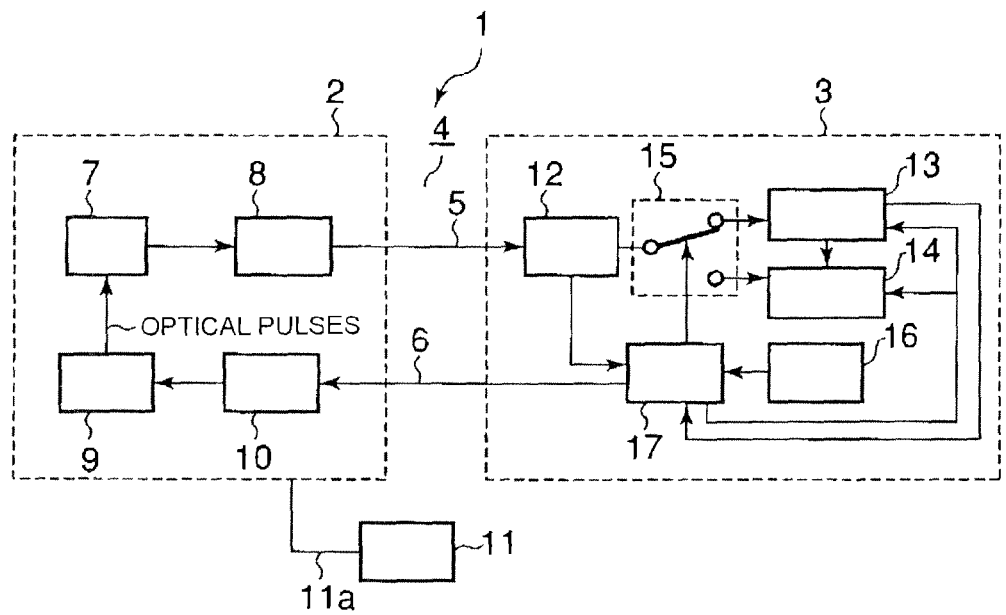
FIG. 1 is a configuration diagram of a first embodiment of the present invention.
Figure 2:
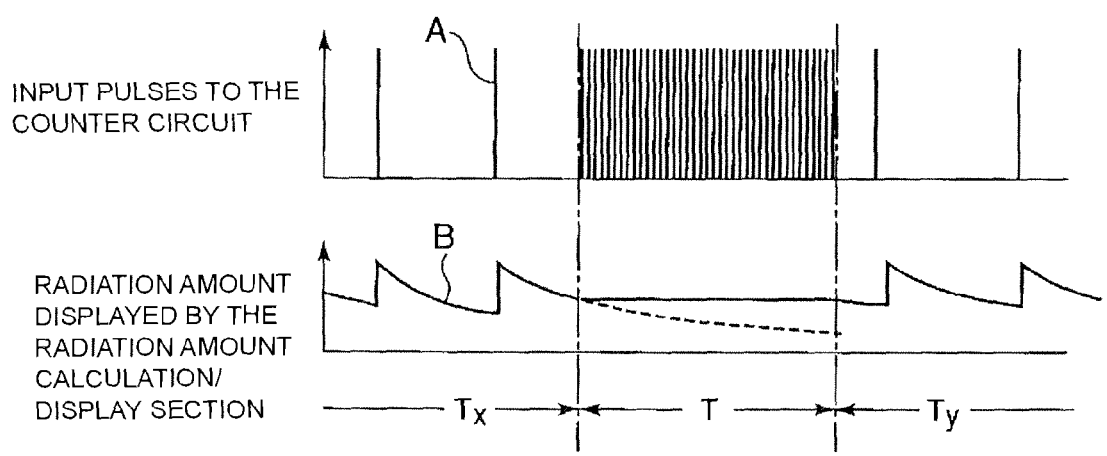
FIG. 2 is a diagram for explaining a change in the count rate in the first embodiment.

A first embodiment will be described with reference to FIGS. 1 and 2. FIG. 1 is a diagram schematically illustrating a configuration of the first embodiment, and FIG. 2 is a diagram for explaining a change in the count rate.

As illustrated in FIG. 1, a radiation monitor 1 includes: a sensor section 2 that is disposed at a location where radiation detection is required; a monitor module section 3 that is disposed at a location remote from the sensor section 2, such as a monitoring room or a central operation room; and monitors radiation, and a signal transmission path 4 that connects the sensor section 2 and monitor module section 3 and performs signal transmission between them. The signal transmission path 4 includes: a first transmission path 5 that is implemented as one cable and transmits signals from the sensor section 2 to the monitor module section 3; and a second transmission path 6 that is implemented as one cable and transmits signals from the monitor nodule section 3 to the sensor section 2.

The sensor section 2 includes: a detection element 7 that detects radiation and has sensitivity with respect also to light, and a signal processing section 8 that converts a detection output from the detection element 7 into an electric signal for output. The sensor section 2 further includes a light emitting element 9 such as a light-emitting diode (LED) that generates optical pulses and irradiates the detection portion of the detection element 7 with the optical pulses; and a light emission control circuit 10 that controls the pulse emission of the light emitting element 9 occurring at a predetermined frequency, ON/OFF of the pulse emission, and intensity of the pulse emission. The sensor section 2 is configured to operate by power supplied, via a power supply line 11a and not-illustrated lines in the sensor section, from a sensor section power source 11 installed near the sensor section 2. The detection element 7 is formed of a semiconductor device which is made of, e.g., silicon or cadmium telluride and has sensitivity with respect both to light and radiation. Alternatively, the detection element 7 may be formed of a scintillator or photomultiplier having sensitivity with respect both to light and radiation. The optical pulse may be selected in accordance with the characteristics of the detection element 7 and light emitting element 9 and may be an optical pulse in the visible light region, optical pulse in the ultraviolet light region or optical pulse in the infrared light region.

The monitor module section 3 includes: a counter circuit section 12 that counts the number of electric signals transmitted thereto from the signal processing section 8 of the sensor section via the first transmission path 5; a radiation amount calculation/display section 13 that calculates radiation amount from the output of the counter circuit section 12 and displays the calculation result; an abnormality determination/display section 14 that compares the output of the counter circuit section 12 with a predetermined reference value to determine whether the output of the counter circuit section 12 is an abnormal value and displays the determination result; and a switching section 15 that has an input terminal connected to the output side of the counter circuit section 12, a first output terminal connected to the radiation amount calculation/display section 13, and a second output terminal connected to the abnormality determination/display section 14, and switches the output destination of the counter circuit section 12 between the radiation amount calculation/display section 13 and the abnormality determination/display section 14.

The monitor module section 3 further includes a timer section 16 that outputs a timing signal at a constant timing, and a sensor operation check mode determination section 17. The sensor operation check mode determination section 17 determines whether a sensor operation check mode is active based on the timing signal of the timer section 16 and the amount of radiation output from the radiation amount calculation/display section 13, and transmits a determination result signal indicating whether the sensor operation check mode is active to the switching section 15, the radiation amount calculation/display section 13 and the abnormality determination/display section 14. The determination result signal is further transmitted to the light emission control circuit 10 of the sensor section 2 via the second transmission path 6.

The monitor module section 3 is configured to operate by power supplied from a not-illustrated monitor module power source.

The sensor operation check mode determination section 17 is configured to receive the timing signal at a constant period from the timer section 16 and, in response to the timing signal, enters the sensor check mode for a predetermined time period. In the case where the output of the sensor section 2 exhibits a high count rate and where the radiation amount calculated by the radiation amount calculation/display section 13 is not less than a predetermined certain value, the sensor operation check mode determination section 17 does not enter the sensor check mode for allowing detection of whether the sensor section 2 is in a failed state of being insensitive to radiation. That is, assume that, for example, a failed state is not allowed to continue for five minutes or more. In this configuration, in the case where a signal corresponding to radiation is counted every ten minutes, the sensor check mode is activated one or more times every five minutes; on the other hand, in the case where a signal corresponding to radiation is counted every one minute, the sensor check mode need not be activated.

In the sensor check mode, the switching section 15 switches the output destination of the counter circuit section 12 from the radiation amount calculation/display section 13 to the abnormality determination/display section 14 and transmits the determination result signal indicating that the sensor operation check mode is active to the light emitting control circuit 10, the radiation amount calculation/display section 13 and the abnormality determination/display section 14. During reception of the determination result signal indicating that the sensor operation check mode is active, i.e., only in the time period during which the sensor check mode is active, the light emission control circuit 10 controls the light emitting element 9 to emit optical pulses at a predetermined frequency to thereby irradiate the detection portion of the detection element 7 with the optical pulses. After termination of the sensor check mode, the switching section 15 switches the output destination of the counter circuit section 12 from the abnormality determination/display section 14 to the radiation amount calculation/display section 13 and stops the transmission of the determination result signal indicating that the sensor operation check mode is active to the light emitting control circuit 10, the radiation amount calculation/display section 13 and the abnormality determination/display section 14.

The abnormality determination/display section 14 determines presence/absence of abnormality depending on whether the counting number of the counter circuit section 12 per unit time falls within a predetermined range while the sensor check mode is active. In addition to the function of determining presence/absence of abnormality, the abnormality determination/display section 14 may have a function of self-diagnosing a circuit so as to check the operating voltage or operation state of a CPU, etc. Further, in addition to the function of displaying the determination result, the abnormality determination/display section 14 may have a function of outputting a signal notifying sections other than the monitor module section 3 of the abnormality determination result.

While the sensor check mode is not active, the radiation amount calculation/display section 13 receives the value output from the counter circuit section 12 and performs calculation of the radiation amount. While the sensor check mode is active, the radiation amount calculation/display section 13 stops the radiation amount calculation and retains a value that has been acquired most recently, i.e., a value of the radiation amount output from the counter circuit section 12 that has been acquired immediately before the activation of the sensor operation check mode.

A state before and after the period during which the sensor check mode is active is illustrated in FIG. 2. In FIG. 2, T denotes a period during which the sensor check mode is active, Tx and Ty denote periods before and after the sensor check mode, respectively, the upper side graph represents a state of a pulse signal A to be input to the counter circuit section 12, and the lower side graph represents a radiation amount B calculated by the radiation amount calculation/display section 13.

As illustrated in FIG. 2, the pulse signal to be input to the counter circuit section 12 is input to the abnormality determination/display section 14 while the sensor check mode is active, so that no pulse signal is input to the radiation amount calculation/display section 13. Here, assuming that the radiation amount calculation/display section 13 performs calculation of the count rate with a time constant decay taken into consideration, when the radiation amount calculation/display section 13 continues decay calculation even during the sensor check mode, the count rate becomes too low at the time point at which the sensor check mode is ended, as denoted by broken curve in the lower side graph.

In order to prevent the count rate from being too low, the radiation amount calculation/display section 13 does not perform the decay calculation during the sensor check mode but retains the value that has been acquired immediately before the activation of the sensor check mode. In addition to the function of calculating the radiation amount, the radiation amount calculation/display section 13 may have a function of changing a setting value for the calculation. Further, in addition to the function of displaying the radiation amount obtained through the calculation or setting value, the radiation amount calculation/display section 13 may have a function of outputting a signal notifying sections other than the monitor module section 3 of the calculation result of the radiation amount or setting value.

Thus, the radiation monitor 1 can be configured to periodically perform operation check using optical pulses when the radiation amount is not more than a certain value without influencing radiation measurement itself.

Although the switching section 15 is used to switch the output destination of the counter circuit section 12, a configuration that does not use the switching section 15 may be employed. In this configuration, the output of the counter circuit section 12 is simultaneously input to the radiation amount calculation/display section 13 and the abnormality determination/display section 14. Then, when the mode determined by the sensor operation check mode determination section 17 is the sensor check mode, the radiation amount calculation/display section 13 is made to stop a calculation process of converting the output of the counter circuit section 12 into the radiation amount; on the other hand, when the mode determined by the sensor operation check mode determination section 17 is not the sensor check mode, the radiation amount calculation/display section 13 is made to perform the calculation process. Further, although the first transmission path 5 and the second transmission path 6 of the signal transmission path 4 connecting the sensor section 2 and the monitor module section 3 are constituted by two cables, the signal transmission path 4 may be constituted by more cables for transmission of, e.g., digital values. Further, the first transmission path 5 and the second transmission path 6 may be implemented in a single cable having a plurality of set of signal/ground lines.

Second Embodiment

Figure 3:
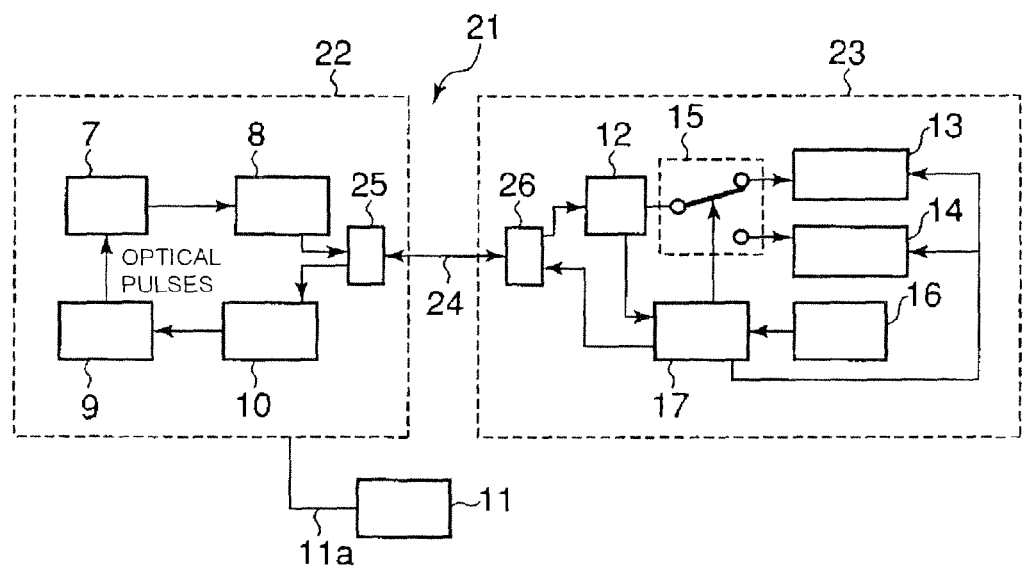
FIG. 3 is a configuration diagram of a second embodiment of the present invention.

A second embodiment will be described with reference to FIG. 3. FIG. 3 is a diagram schematically illustrating a configuration of the second embodiment. The second embodiment differs from the first embodiment in a configuration of the signal transmission/reception part between the sensor section and monitor module section but operates in the same manner as the first embodiment. The same reference numerals as those in the first embodiment are given to the same or corresponding parts as those in the first embodiment, and the descriptions thereof will be omitted here. In the following, only the different point from the first embodiment will be described.

As illustrated in FIG. 3, a radiation monitor 21 includes: a sensor section 22 that is disposed at a location where radiation detection is required; a monitor module section 23 that is disposed at a location remote from the sensor section 22, such as a monitoring room or a central operation room; and a single signal transmission path 24 that connects the sensor section 22 and the monitor module section 23, and performs signal transmission between them. The signal transmission path 24 includes one cable that uses a single transmission path to transmit, in a superimposing manner, reverse direction signals, i.e., a signal from the sensor section 22 to the monitor module section 23 and a signal from the monitor module section 23 to the sensor section 22.

The sensor section 22 includes a detection element 7, signal processing section 8, a light emitting element 9, and a light emission control circuit 10 that have the same configuration as those in the first embodiment. The sensor section 22 further includes a sensor-side signal decode/encode section 25 serving as a sensor-side transmission/reception section for transmitting/receiving signals between the sensor section 22 and the monitor module section 23. The sensor section 22 is configured to operate by a power supplied, via the power supply line 11a and not-illustrated lines in the sensor section, from a sensor section power source 11. The monitor module section 23 includes a counter circuit section 12, a radiation amount calculation/display section 13, an abnormality determination/display section 14, a switching section 15, a timer section 16, and sensor operation check mode determination section 17 that have the same configuration as those in the first embodiment. The monitor module section 23 further includes a monitor module-side signal decode/encode section 26 serving as a monitor module-side transmission/reception section for transmitting/receiving signals between the monitor module section 23 and the sensor section 22.

The sensor-side signal decode/encode section 25 of the sensor section 22 has: an input terminal connected to the output terminal of the signal processing section 8, an output terminal connected to the input terminal of the light emission control circuit 10, and an input/output terminal connected to one end of the signal transmission path 24. The monitor module-side signal decode/encode section 26 of the monitor module section 23 has: an output terminal connected to the input terminal of the counter circuit section 12, an input terminal connected to the output terminal of the sensor operation check mode determination section 17, and an input/output terminal connected to the other end of the signal transmission path 24.

With the above configuration, the sensor-side signal decode/encode section 25 of the sensor section 22 transmits the output of the signal processing section 8, which is an electric signal converted from the detection output of the detection element 7, to the monitor module section 23 via the signal transmission path 24 while receiving the determination result signal of the sensor operation check mode determination section 17 output from the monitor module-side signal decode/encode section 26 with the both signals superimposed on each other. The monitor module-side signal decode/encode section 26 of the monitor module section 23 transmits the determination result signal of the sensor operation check mode determination section 17 to the sensor section 22 via the signal transmission path 24 while receiving the output of the signal processing section 8 from the sensor-side signal decode/encode section 25 with the both signals superimposed on each other.

As a result, the transmission/reception of signals between the sensor section 22 and the monitor module section 23 can be performed by means of the single transmission path 24, thereby achieving the same effect as that of the first embodiment. In addition, the number of transmission paths required for connecting the sensor section 22 and the monitor module section 23 can be reduced. Particularly, in a case where the sensor section 22 and the monitor module section 23 are installed remotely from each other, component cost or installation time/cost can be reduced.

Third Embodiment

Figure 4:
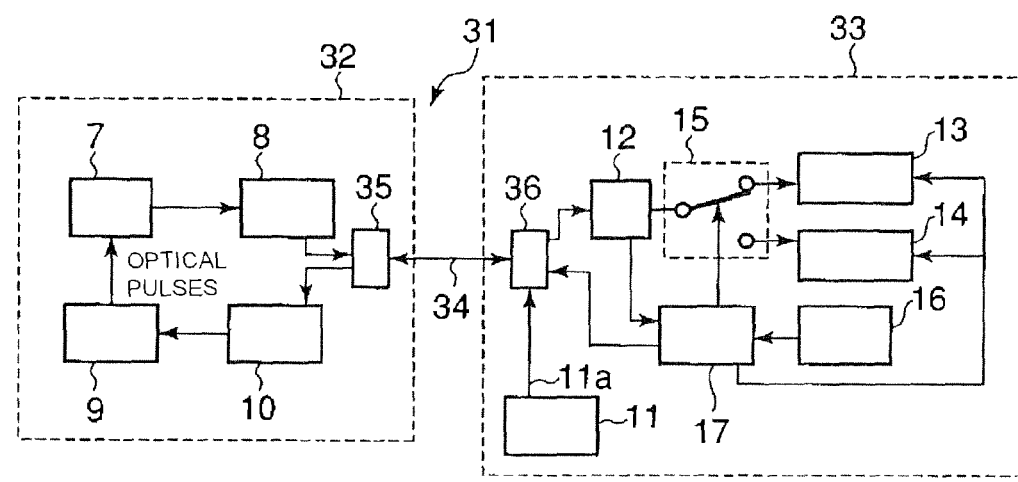
FIG. 4 is a configuration diagram of a third embodiment of the present invention.

A third embodiment will be described with reference to FIG. 4. FIG. 4 is a diagram schematically illustrating a configuration of the third embodiment. The third embodiment differs from the first embodiment and the second embodiment in configurations of the signal transmission/reception part between the sensor section and the monitor module section, and the power supply part for supplying power to the sensor section, but operates in the same manner as the first and second embodiments. The same reference numerals as those in the first embodiment and the second embodiment are given to the same or corresponding parts as those in the first and second embodiments, and the descriptions thereof will be omitted here. In the following, only the different points from the first embodiment and the second embodiment will be described.

As illustrated in FIG. 4, a radiation monitor 31 includes: a sensor section 32 that is disposed at a location where radiation detection is required; a monitor module section 33 that monitors radiation at a location remote from the sensor section 32, such as a monitoring room or a central operation room; and a single signal/power transmission path 34 that connects the sensor section 32 and the monitor module section 33, and performs signal transmission between them as well as supplies power to the sensor section 32. The signal/power transmission path 34 includes one power cable that uses a single transmission path to transmit, in a superimposing manner, reverse direction signals, i.e., a signal from the sensor section 32 to the monitor module section 33 and a signal from the monitor module section 33 to the sensor section 32 and power to be supplied to the sensor section 32, or includes one composite cable incorporating, in one sheath, a signal line for transmitting signals in a superimposing manner and a power line for supplying power.

The sensor section 32 includes a detection element 7, a signal processing section 8, a light emitting element 9, and a light emission control circuit 10 that have the same configuration as those in the first embodiment. The sensor section 32 further includes a sensor-side signal decode/encode and power supply section 35 serving as a sensor-side transmission/reception and power supply section for transmitting/receiving signals between the sensor section 32 and the monitor module section 33 and receiving power. The sensor section 32 is configured to operate by a power supplied, via the signal/power transmission path 34, the sensor-side signal decode/encode and power supply section 35, and not-illustrated lines in the sensor section, from the sensor section power source 11 provided in the monitor module section 33. The monitor module section 33 includes a counter circuit section 12, a radiation amount calculation/display section 13, an abnormality determination/display section 14, a switching section 15, a timer section 16, and a sensor operation check mode determination section 17 that have the same configuration as those in the first embodiment. The monitor module section 33 further includes a monitor module-side signal decode/encode and power superimposition section 36 serving as a monitor module-side transmission/reception and power supply section for transmitting/receiving signals between the monitor module section 33 and the sensor section 32 and transmitting power.

The sensor-side signal decode/encode and power supply section 35 of the sensor section 32 has: a signal input terminal connected to the output terminal of the signal processing section 8, a signal output terminal connected to the input terminal of the light emission control circuit 10, a not-illustrated power output terminal connected to lines in the sensor section, and an input/output terminal connected to one end of the signal/power transmission path 34. The monitor module-side signal decode/encode and power superimposition section 36 of the monitor module section 33 has: a signal output terminal connected to the input terminal of the counter circuit section 12, a signal input terminal connected to the output terminal of the sensor operation check mode determination section 17, a power input terminal connected to the power supply line 11a connected to the sensor section power source 11, and an input/output terminal connected to the other end of the signal/power transmission path 34.

With the above configuration, the sensor-side signal decode/encode and power supply section 35 of the sensor section 32 transmits the output of the signal processing section 8, which is an electric signal converted from the detection output of the detection element 7, to the monitor module section 33 via the signal/power transmission path 34 while receiving the determination result signal of the sensor operation check mode determination section 17 output from the monitor module-side signal decode/encode and power superimposition section 36 with the both signals and power super-imposed on one another or in such a manner that the superimposed signal of the both signals and power are transmitted/received on different lines. The monitor module-side signal decode/encode and power superimposition section 36 of the monitor module section 33 supplies power and transmits the determination result signal of the sensor operation check mode determination section 17 to the sensor section 32 via the signal/power transmission path 34 while receiving the output of the signal processing section 8 from the sensor-side signal decode/encode and power supply section 35 with the both signals superimposed on each other.

As a result, the transmission/reception of signals and power supply/reception between the sensor section 32 and the monitor module section 33 can be performed by means of the single transmission path 34, thereby achieving the same effect as that of the first embodiment. In addition, the number of transmission paths required for connecting the sensor section 32 and the monitor module section 33 can be reduced. Particularly, in the case where the sensor section 32 and the monitor module section 33 are installed remotely from each other, component cost or installation time/cost can be reduced. Furthermore, it is possible to eliminate the need to ensure the sensor section power source 11 for the sensor section 32 at the site where radiation is detected, making the structure of the sensor section 32 simple.

What is claimed is:

1. A radiation monitor comprising a sensor section and a monitor module section which are disposed separately from each other and connected to each other via a signal transmission path, wherein
the sensor section comprises:
  a detection element that detects radiation and has sensitivity with respect also to light,
  a signal processing section that converts an output from the detection element into an electric signal for output,
  a light emitting element that irradiates the detection element with light, and
  a light emission control circuit that controls a pulse emission of the light emitting element occurring at a predetermined frequency, an on/off of the pulse emission, and an intensity of the pulse emission;
the monitor module section comprises:
  a counter circuit section that counts a number of electric signals transmitted thereto from the signal processing section;
  a radiation amount calculation/display section that calculates a radiation amount from an output of the counter circuit section and displays a calculation result;
  an abnormality determination/display section that determines whether the output of the counter circuit section is an abnormal value and displays a determination result;
  a switching section that switches an output destination of the counter circuit section between the radiation amount calculation/display section and the abnormality determination/display section and transmits a determination result signal indicating that a sensor operation check mode is active to the light emission control circuit, the radiation amount calculation/display section and the abnormality determination/display section;
  a timer section that outputs a timing signal at a constant timing; and
  a sensor operation check mode determination section that determines whether the sensor operation check mode is active based on the timing signal of the timer section and an amount of radiation output from the radiation amount calculation/display section, and transmits the determination result signal indicating whether the sensor operation check mode is active to the switching section, the radiation amount calculation/display section, the abnormality determination/display section, and the light emission control circuit; and
the signal transmission path transmits an output signal from the signal processing section to the counter circuit section and transmits a signal from the sensor operation check mode determination section to the light emission control circuit.

2. The radiation monitor according to claim 1, wherein the radiation amount calculation/display section has a calculation stop function of stopping calculation of the radiation amount performed based on the output of the counter circuit section during the sensor operation check mode.

3. The radiation monitor according to claim 1, wherein the signal transmission path includes a first transmission path that transmits an output signal from the signal processing section to the counter circuit section and a second transmission path that transmits a signal from the sensor operation check mode determination section to the light emission control circuit.

4. The radiation monitor according to claim 1, wherein the signal transmission path is a single transmission path, the sensor section comprises a sensor-side transmission/reception section that performs transmission/reception with the monitor module section via the single transmission path by superimposing a signal to be input to the light emission control circuit and an output signal from the signal processing section, and
the monitor module section comprises a monitor module-side transmission/reception section that performs transmission/reception with the sensor-side transmission/reception section via the single transmission path by superimposing the determination result signal output from the sensor operation check mode determination section and an electric signal output from the signal processing section.

5. The radiation monitor according to claim 1, wherein the signal transmission path is a single signal/power transmission path,
the sensor section comprises a sensor-side transmission/reception and power supply section that performs transmission/reception with the monitor module section via the single signal/power transmission path for supplying power to the sensor section by superimposing a signal to be input to the light emission control circuit and an output signal from the signal processing section, and
the monitor module section comprises a monitor module-side transmission/reception and power supply section that performs transmission/reception with the sensor-side transmission/reception section via the single signal/power transmission path for supplying power to the sensor section by superimposing the determination result signal output from the sensor operation check mode determination section and an electric signal output from the signal processing section.

6. The radiation monitor according to claim 1, wherein in a case where an output of the sensor operation check mode determination section indicates that the sensor operation check mode is active, the radiation amount calculation/display section retains a value of the radiation amount calculated from the output of the counter circuit section which has been acquired immediately before an activation of the sensor operation check mode.

7. The radiation monitor according to claim 1, wherein when an output of the sensor section exhibits a predetermined count rate and where the radiation amount calculated by the radiation amount calculation/display section is at or greater than a predetermined value, the sensor operation check mode determination section does not enter the sensor operation check mode for allowing detection of whether the sensor section is in a failed state in which the sensor section is insensitive to radiation.

8. The radiation monitor according to claim 1, wherein the abnormality determination/display section determines a presence/absence of an abnormality depending on whether a counting number of the counter circuit section per unit time falls within a predetermined range while the sensor operation check mode is active.

9. The radiation monitor according to claim 1, wherein when the sensor operation check mode is active, the light emission control circuit controls the light emitting element to emit optical pulses at the predetermined frequency to irradiate a detection portion of the detection element with optical pulses.

10. The radiation monitor according to claim 1, wherein after termination of the sensor operation check mode, the switching section switches the output destination of the counter circuit section from the abnormality determination/display section to the radiation amount calculation/display section, and stops a transmission of the determination result signal indicating that the sensor operation check mode is active.

11. The radiation monitor according to claim 1, wherein when the sensor operation check mode is not active, the radiation amount calculation/display section receives the output from the counter circuit section and performs calculation of the radiation amount.

* * * * *